United States Patent Office 3,067,825
Patented Dec. 11, 1962

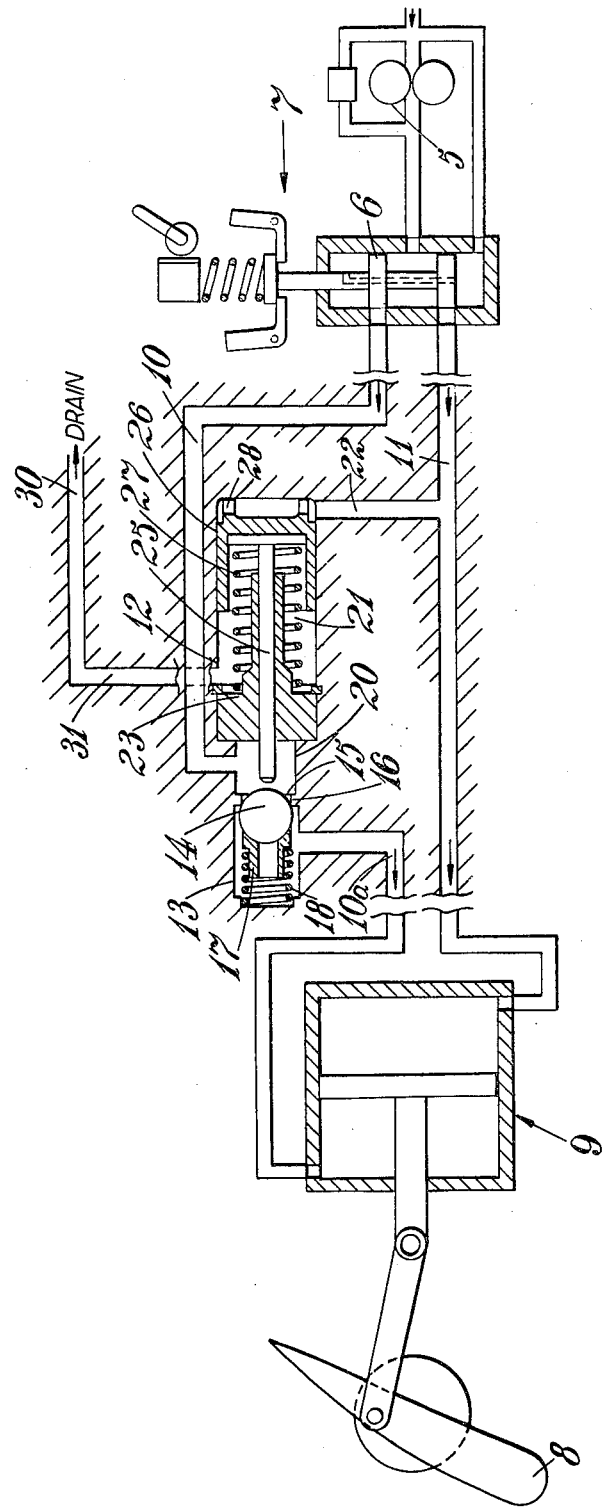

3,067,825
COARSE PITCH CONDUIT VALVE AND OPERATOR FOR HYDRAULIC VARIABLE PITCH PROPELLERS
John Alfred Chilman and Raymond Arthur Cotton, Gloucester, England, assignors, by mesne assignments, to Dowty Rotol Limited, Gloucester, England, a British company
Filed Dec. 12, 1957, Ser. No. 702,303
Claims priority, application Great Britain Dec. 18, 1956
4 Claims. (Cl. 170—160.2)

This invention relates to hydraulic variable pitch propellers of the kind including a double acting hydraulic pitch change motor actuable to adjust the pitch of the propeller blades, in the pitch coarsening sense, by hydraulic fluid under pressure supplied to the coarse pitch side of the pitch change motor through a coarse pitch fluid conduit, and, in the pitch fining sense, by hydraulic fluid under pressure supplied to the fine pitch side of the pitch change motor through a fine pitch fluid conduit, the coarse pitch fluid conduit being used as a drain conduit when fluid under pressure is supplied through the fine pitch fluid conduit and vice-versa.

It is known that with a propeller of the kind described, employed for the propulsion of an aircraft, failure of the hydraulic system can result in uncontrolled pitch fining movements of the blades due to the centrifugal forces acting upon them. This in turn may result in dangerous overspeeding of the engine driving the propeller especially in the case where the propeller is driven by a gas turbine engine.

According to the invention, there is provided, in a propeller of the kind described, a non-return valve in said coarse pitch fluid conduit closable to prevent exhaustion of hydraulic fluid from the coarse pitch side of the pitch change motor through said coarse pitch fluid conduit, and holding means operable to hold said non-return valve open so long as the pressure in said fine pitch fluid conduit is maintained above a predetermined value not greater than the minimum fine pitch fluid pressure required to adjust the blades of the propeller in the pitch fining sense.

With the arrangement as just defined it will be appreciated that uncontrolled pitch fining movement of the propeller blades which might occur due to failure of the fine pitch fluid pressure is prevented since when the non-return valve is free to close the valve will close to prevent hydraulic fluid exhausting from the coarse pitch side of the pitch change motor thereby trapping a volume of fluid on the coarse pitch side of the pitch change motor and locking the pitch change motor against pitch fining movement.

The valve, even when free to close, does not however prevent fluid under pressure being supplied through the coarse pitch conduit to the coarse pitch side of the pitch change motor to adjust the blades in the pitch coarsening direction. Following a failure of the fine pitch fluid pressure therefore, and closure of the non-return valve, the propeller may be feathered, provided always of course that the cause of the fine pitch fluid pressure failure does not prevent the feathering operation being performed.

Preferably said predetermined value is the normal minimum operating fine pitch fluid pressure. In this case, the non-return valve is held open during all phases of normal operation of the propeller. Preferably also said means is operable by the fine pitch fluid pressure to hold said non-return valve open.

Thus in one form of the invention said means comprises a piston and cylinder displaceable relatively to one another against the action of spring means, by fine pitch fluid pressure in excess of said predetermined value acting in the cylinder, to hold said non-return valve open.

One embodiment of the present invention will now be described merely by way of example, and with reference to the accompanying drawing which shows, in diagrammatic form, part of a variable pitch propeller according to the invention.

Referring to the drawing, the propeller comprises a double acting hydraulic pitch change motor 9 which motor is actuable to adjust the pitch of the propeller blades 8, in the pitch coarsening sense, by hydraulic fluid under pressure supplied to the coarse pitch side of the pitch change motor 9 through a coarse pitch fluid conduit 10, and in the pitch fining sense by hydraulic fluid under pressure supplied to the pitch fining side of the pitch change motor 9 through a fine pitch fluid conduit 11.

During normal operation the pitch of the propeller is controlled by a conventional constant speed mechanism in the form of a constant speed unit 7 including a hydraulic control valve 6 which, in well known manner, is displaceable from an equilibrium position to supply pressure fluid from pump 5 either to the conduit 10 or the conduit 11 when it is required to adjust the pitch of the blades 8 in the pitch coarsening or pitch fining sense respectively, the conduit 11 being placed by the control valve 6 in communication with a drain when pressure fluid is supplied to the conduit 10 and vice versa.

The conduits 10 and 11 as shown in the drawing are formed in the propeller hub. The hub is provided with a bore, generally indicated at 12, having its long axis coincident with the axis of rotation of the hub. At its forward end, the left hand end in the drawing, the bore 12 has a lengthwise extending part 13 which houses a non-return valve so arranged as to permit fluid to flow into the conduit 10a from conduit 10 but not in the reverse direction. The valve comprises a ball 14 which seats in a circular aperture 15, the seating for the ball 14 being provided by a radially inwardly directed flange 16 in the bore 12. A sleeve member 17, having a thickened end portion provided with a part spherical seating, is held against the ball 14 by a spring 18 engaged between the forward end of the part 13 of the bore 12 and the thickened portion of the sleeve 17, the spring 18 urging the sleeve 17 and the ball 14 rearwardly to engage the ball 14 in the aperture 15 and close it.

Rearwardly of the part 13 the bore 12 has a further lengthwise extending part 20 of slightly reduced diameter. The bore parts 13 and 20 form part of the conduit 10, one part of the conduit 10 proper opening into the bore part 20 and another part 10a of the conduit 10 leading from the bore part 13 to the coarse pitch side of the pitch change motor. It will be seen therefore that the non-return valve referred to above is in the conduit 10, and furthermore that the non-return valve is closable to prevent hydraulic fluid exhausting from the coarse pitch side of the pitch change motor 9 through the coarse pitch fluid conduit.

Rearwardly of the bore part 20 the bore has an increased diameter lengthwise extending part 21 which at its rearward end is communicated with the conduit 11 by means of a branch conduit 22.

A stepped cylindrical member 23 is located at the forward end of the bore part 21 the member 23 being provided with a central bore the long axis of which is coincident with the rotational axis of the hub.

The central bore in the member 23 receives the piston rod 25 of a piston 26 housed in the bore part 21 to the rear of the member 23, the piston rod 25 extending through the member 23 into the bore part 20.

The piston 26 is a sliding fit in the bore part 21 and is urged in the rearward direction by a spring 27 which at its forward end abuts against a step in the member 23.

On the side remote from the rod 25 the piston 26 is provided with an apertured extension 28 which limits the rearward movement of the piston 26 in the bore part 21.

Forward movement of the piston 26 in the bore part 21 is limited as hereinafter described.

The hub is provided with a further passage 30 which, at all times communicates with a drain which, in the example being described, is the oil system of the engine driving the propeller. A branch passage 31 places the passage 30 in communication with the bore part 21 on the forward side of the piston 26, the passage 31 opening into the bore part 21 immediately adjacent the circular clip 24.

The piston 26 and the bore part 21 constitute a piston and cylinder assemblage, and the piston 26 is displaceable to the left in the drawing against the action of the spring 27, by fine pitch fluid pressure acting in the bore part 21 on the right hand side of the piston 26.

When the piston 26 is so displaced the rod 25 engages the ball 14 through the aperture 15 and pushes the ball 14 forwardly clear of the aperture 15 against the action of the spring 18, thereby holding the non-return valve open. Forward movement of the piston 26 is limited by the sleeve member 17, which comes up against the end wall of the bore part 13, the sleeve member 17 being displaced with the ball 14 by the piston.

In the propeller being described the fine pitch fluid has a normal operating minimum pressure of 70 lbs. per square inch. The fine pitch fluid pressure falls to its normal operating minimum value when the constant speed unit previously referred to places the conduit 11 in communication with drain during adjustment of the propeller pitch in the pitch coarsening direction. The springs 27 and 18 are so chosen that the piston 26 remains displaced to the left in the drawing so long as the pressure in the conduit 11 is maintained above its normal operating minimum value.

It will be appreciated therefore that during all phases of normal operation of the propeller the non-return valve 14 is held open by the piston 26, and hydraulic fluid is free to pass to and from the coarse pitch side of the pitch change motor through the coarse pitch fluid conduit.

Upon any failure of the hydraulic system of the propeller resulting in a fall of pressure in the conduit 11 below 70 lbs. per square inch however, the piston 26 will be displaced by the spring 27 to the right in the drawing and the non-return valve will become free to close, thereby preventing hydraulic fluid exhausting from the coarse pitch side of the pitch change motor through the coarse pitch fluid conduit.

Upon failure of the hydraulic system resulting in a fall of pressure in the conduit 11 below the normal operating minimum therefor, any uncontrolled pitch fining movements of the blades 8 under the action of centrifugal force acting upon them is prevented since the non-return valve, being free to close, will close to prevent hydraulic fluid exhausting from the coarse pitch side of the pitch change motor 9 thereby trapping a volume of hydraulic fluid on the coarse pitch side of the pitch change motor 9 and locking the pitch change motor 9 against pitch fining movement.

Following failure of the hydraulic system resulting in a fall of pressure in the conduit 11 it is still possible to feather the propeller however provided that the cause of the hydraulic failure does not involve the coarse pitch fluid conduit 10.

In order to feather the propeller, hydraulic fluid under pressure is supplied through the conduit 10, the bore part 20, the aperture 15, the bore part 13 and the conduit 10a to the coarse pitch side of the pitch change motor, the non-return valve opening as soon as the pressure in the bore part 20 builds up above the pressure on the coarse pitch side of the pitch change motor.

Once the propeller has been feathered and the usual feathering pump, which supplies fluid under pressure for feathering the propeller, has been stopped, the non-return valve again closes and holds the propeller in its feathered condition.

It should be further understood that the non-return valve normally performs this last mentioned function when the propeller is feathered, since then the pressure in the conduit 11 would be below its normal operating minimum value.

Although in the example described the piston 26 is held displaced to the left in the drawing during all phases of normal operation of the propeller, it will be appreciated that it may be arranged that the piston 26 be displaced to the left in the drawing to hold the non-return valve open only when the pressure in the fine pitch fluid conduit 11 is raised sufficiently to operate the pitch change motor in the pitch fining direction. In these circumstances the non-return valve would be open only when it was required to communicate the coarse pitch side of the pitch change motor with the drain through the constant speed unit in order to allow hydraulic fluid to exhaust from the coarse pitch side of the pitch change motor. When operating in this manner it will be appreciated that pitch coarsening movements of the pitch change motor are not prevented even although in these circumstances the pressure in the conduit 11 would drop to its normal minimum operating value and the non-return valve would become free to close. This is because as soon as the pressure in the conduit 10 is raised above that on the pitch change motor side of the non-return valve by an amount sufficient to overcome the spring 18, the non-return valve opens to allow fluid under pressure to pass to the coarse pitch side of the pitch change motor.

It is to be understood that the drawing is purely diagrammatic and that in practice the bore parts 13 and 21 would be defined each by members capable of separation in order to facilitate assemblage and maintenance of the working parts.

We claim:

1. In the control system of a variable pitch propeller subject to an external force tending to reduce the pitch thereof, the combination including a fluid motor for adjusting propeller pitch, said motor comprising a cylinder and a piston movable in said cylinder in one direction to increase the propeller pitch and in the reverse direction to decrease the propeller pitch, said piston defining within said cylinder a fine pitch chamber which decreases in volume when the piston moves in the pitch increasing direction and a coarse pitch chamber which decreases in volume when the piston moves in the pitch decreasing direction, fine pitch conduit means leading to the fine pitch chamber, coarse pitch conduit means leading to the coarse pitch chamber, a source of fluid pressure, a pressure conduit from said source, a drain conduit, valve means in operative connection within said fine pitch, coarse pitch, pressure and drain conduits and operable selectively to connect said pressure conduit to said fine pitch conduit, and said coarse pitch conduit to said drain conduit; and alternatively said pressure conduit to said coarse pitch conduit and said fine pitch conduit to said drain conduit, a normally closed non-return valve in said coarse pitch conduit to prevent fluid draining from said coarse pitch chamber, holding means separate from but capable of engaging said non-return valve, urging means for urging said holding means away from said non-return valve and connecting means placing said holding means under the influence of the pressure of the fluid in said fine pitch conduit to overcome said urging means when the pressure in said fine pitch conduit reaches the minimum operating pressure for moving the piston in the pitch decreasing direction to move said holding means to hold open said non-return valve.

2. A propeller as claimed in claim 1, wherein said holding means comprises a piston and cylinder device having a piston rod connected to the piston and engaging the non-return valve, said piston being displaceable relative to the cylinder against the action of said urging means when said fine pitch conduit fluid pressure reaches said minimum operating pressure so that said piston rod holds said non-return valve open.

3. In a variable pitch propeller having a pitch change motor having therein a fine pitch chamber which increases in capacity on movement of the propeller in the pitch fining direction and a coarse pitch chamber which increases in capacity on movement of the propeller in the pitch coarsening direction, a normally closed non-return valve in said coarse pitch conduit, means separate from said non-return valve for detecting the pressure in the fine pitch conduit and being operative to engage and hold open the said non-return valve only while the pressure in the fine pitch conduit is above a predetermined amount, but while the pressure in the fine pitch conduit is below this predetermined amount and the non-return valve is closed, the non-return valve can only be opened when the pressure in the coarse pitch conduit on the side of the non-return valve remote from the pitch change motor is caused to build up to exceed the pressure acting on that side of the non-return valve nearer the pitch change motor.

4. In the control system of a variable pitch propeller subject to an external force tending to fine the pitch thereof, a piston and cylinder motor for adjusting the propeller pitch, a coarse pitch fluid conduit communicating with the cylinder to actuate the motor to coarsen the propeller pitch, a fine pitch fluid conduit communicating with the cylinder to actuate the motor to fine the propeller pitch, a normally closed non-return valve comprising a valve seat and a valve element spring loaded in engagement with the valve seat and in the coarse pitch fluid conduit arranged to permit fluid to flow through the coarse pitch fluid conduit to the motor but capable of preventing flow in the reverse direction, a member operable to hold the valve element away from its valve seating, and means responsive to the pressure in the fine pitch fluid conduit and connected to said member and arranged to cause it to hold the valve element away from its seating only when the pressure in the fine pitch fluid conduit is above a selected minimum value.

References Cited in the file of this patent

UNITED STATES PATENTS

| | | |
|---|---|---|
| 2,745,499 | Berninger | May 15, 1956 |
| 2,748,877 | Miller | June 5, 1956 |
| 2,855,057 | Van Alstyne | Oct. 7, 1958 |
| 2,889,888 | Fairhurst | June 9, 1959 |
| 2,928,477 | Lambeck | Mar. 15, 1960 |

FOREIGN PATENTS

| | | |
|---|---|---|
| 706,338 | Great Britain | Mar. 31, 1954 |